United States Patent
Agarwal et al.

(10) Patent No.: US 10,819,513 B2
(45) Date of Patent: Oct. 27, 2020

(54) KEY ENCRYPTION KEY (KEK) ROTATION FOR MULTI-TENANT (MT) SYSTEM

(71) Applicant: Oracle International Corporation, Redwood Shores, CA (US)

(72) Inventors: Amit Agarwal, Milpitas, CA (US); Rohit Koul, Sunnyvale, CA (US); Srikant Krishnapuram Tirumalai, Milpitas, CA (US); Jie Wang, Beijing (CN); Xinnong Wang, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 269 days.

(21) Appl. No.: 15/948,405

(22) Filed: Apr. 9, 2018

(65) Prior Publication Data

US 2019/0173674 A1 Jun. 6, 2019

Related U.S. Application Data

(60) Provisional application No. 62/593,770, filed on Dec. 1, 2017.

(51) Int. Cl.
*H04L 29/06* (2006.01)
*H04L 9/08* (2006.01)

(52) U.S. Cl.
CPC .......... *H04L 9/0891* (2013.01); *H04L 9/0822* (2013.01); *H04L 9/0894* (2013.01)

(58) Field of Classification Search
CPC ... H04L 9/0891; H04L 9/0822; H04L 9/0894; H04L 9/14; H04L 63/062; H04L 63/10; G06F 21/602
See application file for complete search history.

(56) References Cited

U.S. PATENT DOCUMENTS

| | | | |
|---|---|---|---|
| 8,565,422 B2 | 10/2013 | Lee et al. | |
| 9,071,429 B1 | 6/2015 | Roth et al. | |
| 9,282,122 B2 | 3/2016 | Cabrera et al. | |
| 9,355,259 B1 | 5/2016 | Choo | |
| 9,455,963 B1 | 9/2016 | Roth et al. | |
| 9,544,140 B1 | 1/2017 | Bhatia et al. | |

(Continued)

OTHER PUBLICATIONS

Raul Garcia—Always Encrypted Key rotation—Column master Key rotation—Aug. 13, 2015 https://blogs.msdn.microsoft.com/sqlsecurity/2015/08/13/always-encrypted-key-rotation-column-master-key-rotation/14 pages.

(Continued)

*Primary Examiner* — Yogesh Paliwal
(74) *Attorney, Agent, or Firm* — Trellis IP Law Group, PC

(57) ABSTRACT

An example method facilitates enabling Key Encryption Key (KEK) rotation for a running multi-tenant system without requiring system downtime or interruption. The example method facilitates decrypting a set of one or more DEKs using a preexisting KEK; using a new KEK to re-encode the DEKs using the new KEK, all while simultaneously enabling servicing of tenant requests. This is enabled in part, by strategic caching of tenant DEKs in a secure local memory, wherein the cached tenant DEKs are maintained in the clear and are readily accessible to running processes that are using the DEKs to decrypt and access tenant data, irrespective of the state of a background process used to implement the KEK rotation to the new KEK.

20 Claims, 6 Drawing Sheets

(56) References Cited

U.S. PATENT DOCUMENTS

| | | | |
|---|---|---|---|
| 9,710,667 B2 | 7/2017 | Pomeroy et al. | |
| 9,779,269 B1* | 10/2017 | Perlman | G06F 16/2291 |
| 9,942,211 B1* | 4/2018 | Campagna | H04L 9/0637 |
| 2012/0140923 A1* | 6/2012 | Lee | H04L 9/088 |
| | | | 380/45 |
| 2015/0310188 A1* | 10/2015 | Ford | G06F 21/10 |
| | | | 726/28 |

OTHER PUBLICATIONS

Always Encrypted (Database Engine) https://docs.microsoft.com/en-us/sql/relational-databases/security/encryption/always-encrypted-database-engine 14 pages.

Shield Platform Encryption Architecture https://www.salesforce.com/assets/pdf/misc/Platform_Encryption_Architecture_White_Paper.pdf 35 pages.

The Intralinks Multi-Tenant SaaS Platform https://www.intralinks.com/sites/default/files/intralinks_multi-tenant_saas_platform_security.pdf 18 pages.

* cited by examiner

KEY ENCRYPTION KEY (KEK) ROTATION FOR MULTI-TENANT (MT) SYSTEM

CROSS REFERENCES TO RELATED APPLICATIONS

This application claims the benefit of U.S. Provisional Patent Application Ser. No. 62/593,770, entitled KEY ENCRYPTION KEY (KEK) ROTATION FOR MULTI-TENANT (MT) SYSTEM WITH ZERO SERVICE DOWNTIME, filed on Dec. 1, 2017, which is hereby incorporated by reference as if set forth in full in this application for all purposes.

BACKGROUND

The present application relates to computing, and more specifically to software and accompanying methods for selectively changing keys used to encrypt data, including other keys in networked computing environments, e.g., multi-tenant computing environments.

Systems and methods for encrypting data using keys (e.g., Data Encryption Keys (DEKs)) and for further encrypting a set of one or more keys using yet another key (e.g., using a Key Encryption Key (KEK)), are employed in various demanding applications, including security mechanisms for multi-tenant enterprise computing environments and accompanying intercommunicating computing resources and users; personal password wallets for maintaining multiple usernames and passwords for different websites; payment solutions used by the banking and credit card industries; government networks, including immigration and customs computer networks, and so on. Such applications often demand efficient mechanisms for facilitating changing of the various keys (called key rotation) without disrupting the operation of software that may require use of the keys, e.g., to communicate with other software.

Systems and methods for enabling efficient management of keys and associated security and permissions functionality can be particularly important in multi-tenant computing environments, where hundreds or thousands of tenants (e.g., users and/or groups of users and their respective computing systems) may require use of cloud resources, and where excessive downtime can be prohibitive.

Intercommunicating cloud-based web services, Application Programming Interfaces (APIs), client-side applications, and other computing resources (e.g., Virtual Machines (VMs) hosting various web services, etc.) often intercommunicate in accordance with strict security procedures, which may include use of authentication mechanisms involving use of different keys, e.g., to encode data; to authenticate users and/or software modules for access to other software modules and data, and so on.

Conventionally, to selectively change or rotate a key (e.g., KEK) that encrypts multiple keys (e.g., DEKs) used by various intercommunicating computing resources, intercommunication between the computing resources is interrupted, resulting in undesirable downtime, which can be prohibitive for some business-critical applications that cannot afford downtime.

For example, in an ICE (Immigration and Customs Enforcement)/TSA (Transportation Security Administration) multi-tenant system that must timely process thousands of incoming passengers, any downtime can be particularly problematic. Hence, such computing environments often particularly demand efficient systems and methods for enabling versatile implementation of security policies, e.g., enabling key rotation, without requiring system downtime.

SUMMARY

An example method facilitates changing an encryption key in a multi-tenant and/or multi-instance computing environment, wherein the encryption key to be changed or rotated is used to encrypt one or more additional encryption keys; without requiring downtime or interruption of running services or programs that use the one or more additional encryption keys to decrypt and access tenant data.

The example method includes determining that an existing encryption key (first encryption key) is to be changed to a new encryption key, wherein the first encryption key encodes one or more second encryption keys; using the existing encryption key to encrypt the new encryption key, resulting in an encrypted new key; storing the encrypted new key in a persistent data store; decrypting the one or more second encryption keys using the existing encryption key, resulting in one or more decrypted second encryption keys; caching the one or more decrypted second encryption keys in secure local memory; employing the one or more decrypted second encryption keys from the secure local memory, in combination with the new encryption key from the persistent data store, to encrypt the one or more second encryption keys using the new encryption key, resulting in a newly encrypted set of one or more second encryption keys; maintaining the newly encrypted set of one or more second encryption keys in the persistent data store; and subsequently using the new encryption key for encrypting and decrypting the one or more second encryption keys when storing and retrieving, respectively, the one or more second encryption keys from the persistent data store.

In a more specific embodiment, the step of determining further includes receiving a request from one or more administrator systems to rotate the first encryption key. The first encryption key represents a Key Encryption Key (KEK). The one or more second encryption keys include one or more Data Encryption Keys (DEKs), also called Tenant Encryption Keys (TEKs) herein. The one or more DEKs are usable to encrypt data associated with one or more respective tenants, which may include, for example, customers of a cloud service. The one or more tenants may further include computing resources of the cloud service(s) that are allocated to different tenants. The data may include, for example, tokens, credentials, and other data used by one or more computing resources allocated for use by the one or more respective tenants.

Hence, the specific example method facilitates decrypting a set of one or more DEKs using a preexisting KEK (also called the prior KEK, the old KEK, or KEK 0 herein); using a new KEK to re-encode (also called re-encrypt herein) the DEKs using the new KEK (also called KEK 1 herein), all while simultaneously enabling servicing of tenant requests. This is enabled in part, by strategic caching of tenant DEKs in the secure local memory, wherein the cached tenant DEKs are maintained in the clear and are readily accessible to running processes that are using the DEKs to decrypt and access tenant data, irrespective of the state of a background process used to implement the KEK rotation to the new KEK.

The process used to implement the KEK rotation may be implemented using batch processing, where re-encryption of various DEKs using the new KEK occurs in batches of a predetermined size, e.g., size 10. Accordingly, if an operation fails, the batch process remains in a usable state, such that the process can be committed or rolled back for the current batch only.

Hence, certain embodiments discussed herein facilitate selectively changing a KEK of an online (running) multi-tenant system, without requiring system downtime or interruption. During KEK rotation processing, DEKs used by tenant service instances are readily accessible via local memory. The DEKs remain accessible as the switch (also called rotation) to a new KEK is implemented.

A further understanding of the nature and the advantages of particular embodiments disclosed herein may be realized by reference of the remaining portions of the specification and the attached drawings.

DETAILED DESCRIPTION OF EMBODIMENTS

Figure 1:
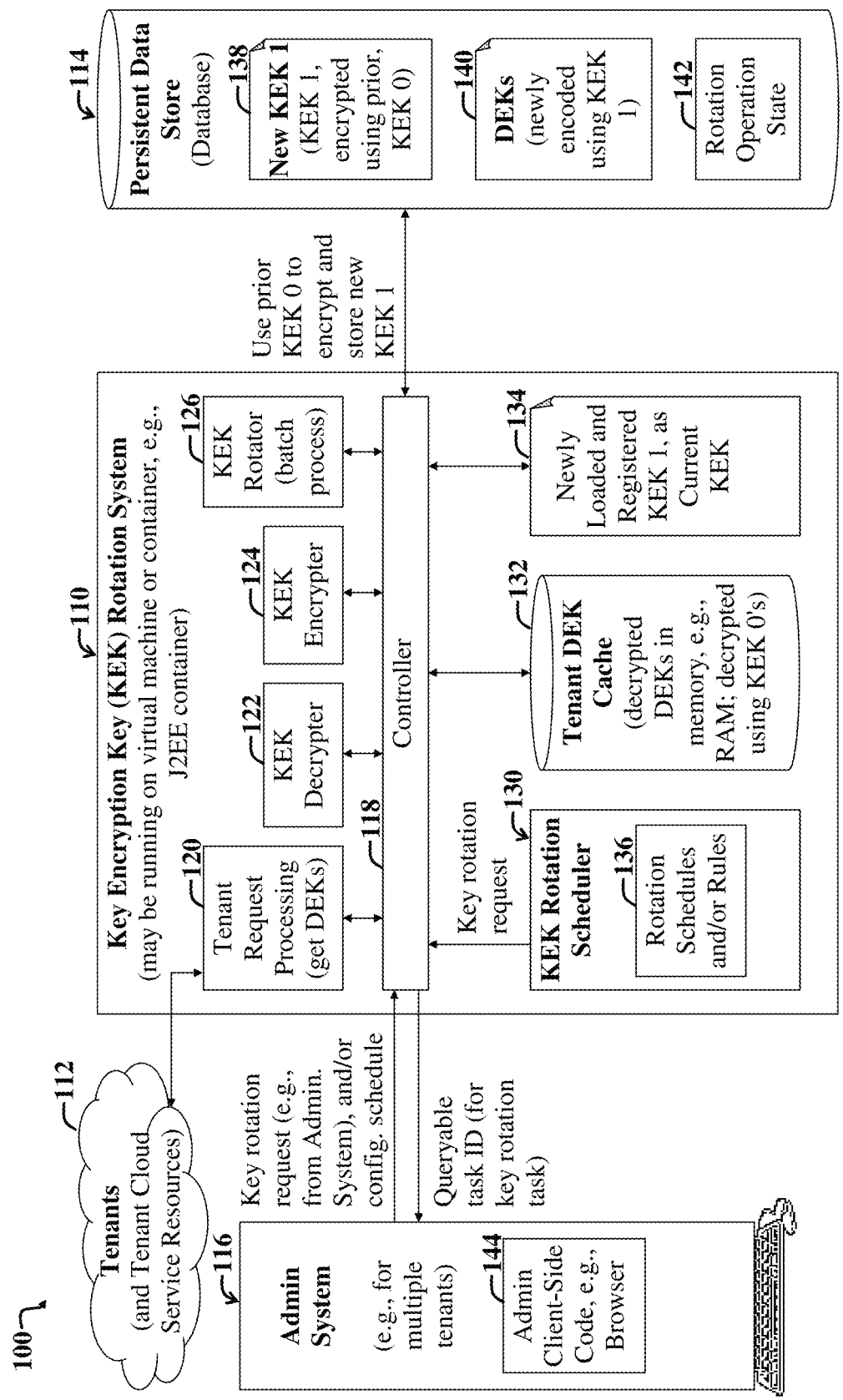
FIG. 1 is a first block diagram illustrating a first example system and accompanying multi-tenant computing environment that facilitates selectively changing, i.e., rotating, a Key Encryption Key (KEK) used by a cloud service to encode Data Encryption Keys (DEKs) for tenants of the cloud service, while obviating the need for interruption or downtime for computing resources of the cloud service used by the tenants.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A multi-tenant computing environment may be any computing environment that includes an instance of a server-side software application that servers plural users or groups of users, often called tenants, who have been allocated shares of computing resources provided by the software application. Depending upon the context in which the term is used, a tenant may refer to a user or group of users who have access to a shared instance of a software application, and/or may further, or alternatively, refer to the share of the software application and associated computing resources allocated to the group of users. Furthermore, in some cases, the user or groups of users can be, or include, other software applications, such that software applications can act as tenants to other software applications. The server-side software application is called a multi-tenant software application or multi-tenant software system herein.

A cloud service may be any mechanism (e.g., one or more web services, Application Programming Interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices.

Note that conventionally, certain enterprise software customers (e.g., enterprises using the enterprise software, wherein the enterprises may be tenants of a given cloud service) may subscribe to and access enterprise software by subscribing to a particular suite of cloud services offered via the enterprise software. Various components of the enterprise software may be distributed across resources (e.g., servers) of a network.

For the purposes of the present discussion, a multi-instance computing environment may include an environment wherein plural instances of plural software applications are shared among plural different users or groups of users. In some cases, each of the plural instances may, in turn, be shared among plural tenants. Accordingly, a multi-instance computing environment can also be a multi-tenant computing environment, and vice versa.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain or server system herein. For the purposes of the present discussion, a computing domain may be any collection of one or more servers running software that is managed by a single administrative server or associated application. An example of a computing domain is a WebLogic Server (WLS) domain.

A given software application may include (but not necessarily) constituent software applications or modules (e.g., services, functions, procedures, computing objects, etc.). Accordingly, the term "software application" may also include networked software applications or integrated groups thereof.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

Systems integration may refer to the establishment of communications between systems, e.g., software systems. When software systems to be integrated include enterprise applications, the integration process may be called Enterprise Application Integration (EAI). When the software systems run on a cloud (e.g., a collection of one or more networked server systems), then integration of the software systems may be called Cloud Application Integration (CAI). Note that embodiments discussed herein are not necessarily limited to a particular type of computing environment or types of software systems being integrated.

Enterprise multi-tenant software applications often demand robust security features, e.g., to protect tenant data; control authentication, authorization, permissions to access data, content, functionality, and so on. Accordingly, such software applications and accompanying computing environments often employ encryption, whereby data is encrypted using cryptographical keys.

For the purposes of the present discussion, a cryptographical key (also simply called a key herein) may be any data or code used to scramble or otherwise encode or encrypt data in accordance with an algorithm, called the encryption algorithm. The data may be decoded or decrypted using the key. A key that is used to encrypt data, e.g., data for a particular tenant (i.e., tenant data), is called a Data Encryption Key (DEK), or alternatively, a Tenant Encryption Key (TEK) herein.

Similarly, a key that is used to encrypt other keys is called a Key Encryption Key (KEK). In various embodiments discussed herein, a KEK is used to encode TEKs (also called Data Encryption Keys (DEKs) herein) for tenants of a multi-tenant software application. When a tenant attempts to access encrypted data, e.g., stored credentials, passwords, etc., the tenant may issue requests to a service or process to obtain the tenant's TEK, so as to enable access to the data. The tenant and/or associated computing resources may use the TEK to decrypt and access their data.

Note that while the DEKs or TEKs discussed herein are called data encryption keys, they may also act as KEKs, without departing from the scope of the present teachings. For example, a given DEK may encode various tenant credentials, software access tokens, and so on, associated with the tenant. Nevertheless, the terms DEK or TEK are used herein to facilitate distinguishing between keys used to encode tenant-related data and/or credentials, tokens, other keys, etc., from a master KEK used to encode the TEKs or DEKs for various tenants.

Use of DEKs and KEKs are widely demanded in security systems, which may benefit from periodic rotation (i.e., selective changing) of the keys. In a multi-tenant computing environment, where hundreds or thousands of tenants are setup, it can be particularly challenging to perform KEK rotation without causing service downtime, as conventionally (absent use of embodiments discussed herein), KEK rotation would involve decryption and re-encryption of the associated DEKs by an online (i.e., running or "live") service used for request processing (e.g., responding to tenant requests for access to their DEKs).

Accordingly, various embodiments discussed herein disclose a system and method for rotating a KEK while not effecting the operation of any existing or new multi-tenant service and associated requests being handled by and/or on behalf of a tenant. Upon completion of KEK rotation, the new KEK can be readily used without requiring system down time, e.g., termination of cloud Virtual Machines (VMs) or containers (e.g., J2EE containers).

For clarity, certain well-known components, such as hard drives, processors, operating systems, power supplies, routers, Internet Service Providers (ISPs), workflow orchestrators, process schedulers, Tenant Automation Systems (TASs), certain web services, virtual machines, middleware, enterprise databases, MetaData Services (MDS) modules, JavaServer Faces (JSF) frameworks and servlets, and so on, are not necessarily explicitly called out in the figures. However, those skilled in the art with access to the present teachings will know which components to implement and how to implement them to meet the needs of a given implementation.

FIG. 1 is a first block diagram illustrating a first example system 100 and accompanying multi-tenant computing environment that facilitates selectively changing, i.e., rotating, a KEK used by a cloud service to encode DEKs for tenants 112 of the cloud service, while obviating the need for interruption or downtime for computing resources of the cloud service used by the tenants 112.

Note that the cloud service is not particularly called out in FIG. 1, but may include and/or may access a KEK rotation system 110 and associated persistent data store 114 (as discussed more fully below) which are used to rotate the KEK for the DEKs used by cloud services that are, in turn, used by the tenants 112. Accordingly, the KEK rotation system 110 and accompanying persistent data store 114 may be hosted via a cloud.

Furthermore, note that in general, groupings of various modules of the system 100 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, the persistent data store 114 may be considered as part of the KEK rotation system 110, which may, in turn, be part of a multi-tenant cloud service used by the tenants.

The example system 100 includes the tenants and associated allocated resources 112 in communication with the KEK rotation system 110, which in turn communicates with the persistent data store 114 and an administrator computer system 116. The administrator system 116 may act as an authorized administrator for the multiple tenants 112 that will be using the KEK rotation system 110 to service their DEK requests to enable access to their tenant data.

The example KEK rotation system 110 includes a controller module 118 in communication with a tenant request processing module 120, a KEK decrypter 122, a KEK encrypter 124, and a KEK rotator 126 that use the KEK decrypter 122 and KEK encrypter 124 to facilitate batch processing of KEK rotation requests, as discussed more fully below.

The controller 118 further communicates with a KEK rotation scheduler 130, a tenant DEK cache (also called the secure local memory herein) 132 and the most recently loaded and used KEK 134. Note that the registered KEK 134 may be stored in the local cache 132 and/or may be encrypted and stored in the persistent data store 114, but is shown separately in FIG. 1 for illustrative purposes.

In the present example embodiment, the controller 118 includes code for facilitating interfacing the various modules 120-136 of the KEK rotation system 110, thereby selectively enabling and facilitating routing and handling of intercommunications between the various modules 120-136. For example, the KEK rotator 126 may leverage, via the controller 118, functionality provided by the KEK decrypter 122 and KEK encrypter 124, e.g., so as to facilitate batch processing of DEKs, as discussed more fully below. Furthermore, the tenant request processing module 120 may also access other modules 12-136, e.g., the tenant DEK cache 132 during operation of a KEK rotation process implemented by the KEK rotator 126.

The administrator system 116 includes client-side code 114, e.g., a browser or other client-side application usable to communicate with the KEK rotation system 110. In the present example embodiment, the communications include issuance of KEK rotation requests to the KEK rotation system 110 and receipt of a queryable task identification (ID) usable to query the status of a given KEK rotation process being performed by the KEK rotator 126. Note that the controller 118 may include code for implementing additional functionality for enabling an administrator using the administrator system 116 to configure one or more settings, parameters, or KEK rotation schedules 136 via functionality provided by a KEK rotation scheduler 130.

Note that, in certain implementations, the administrator system 116 may issue a key rotation request that is directly routed to the KEK rotator 126, e.g., as opposed to first being routed to the KEK rotation scheduler 130. Accordingly, the KEK rotation scheduler 130 is optional and may be omitted, without departing from the scope of the present teachings.

The persistent data store 114 may be implemented by a running database 114 that is accessible to the KEK rotation system 110 and selectively accessible to various modules of the KEK rotation system 110 and the administrator system 116. The persistent data store 114 is said to be persistent, as it maintains data stored therein even if the persistent data store is shut down, e.g., if the power to the computer system running the persistent data store 114 is shut off. Hence, the persistent data store 114 can facilitate maintaining data "offline" for the KEK rotation system 110.

The persistent data store 114 may store various types of data, including a new KEK 138 (KEK 1) that the KEK rotation system 110 will be rotating to. Note that an existing KEK (KEK 0), also called the old KEK or prior KEK herein, is said to be rotated to the new KEK if the existing KEK (KEK 0) used by the KEK rotation system 110 switches from using the old KEK 0 to the new KEK 1 when encrypting and decrypting DEKs used by tenant request processing module 120 to service DEK requests from the tenants 112.

In the present example embodiment, the persistent data store 114 maintains the new KEK (to be rotated to) 138 in encrypted form. The new KEK 138 is encrypted by the KEK rotator 126, using the KEK encrypter 124, and then stored in the persistent data store 114 as the new KEK (KEK 1). The persistent data store 114 further maintains tenant DEKs 140 that have been encoded (e.g., via the KEK rotator 126 and KEK encrypter 124) using the new KEK 138. The persistent data store 114 also maintains a rotation operation state 142, indicative of a state of batch processing performed by the KEK rotator 126, as discussed more fully below.

In an example use case scenario, an administrator using the administration system 116 employs the client-side administrator software 114 to issue a KEK rotation request to the KEK rotation system 110. The KEK rotation system 110 receives the request, e.g., via the controller 118, and then activates the KEK rotation module 126. Optionally, the KEK rotation request is first routed through the KEK rotation scheduler 130.

The KEK rotator 126 then decrypts and caches all tenant DEKs, e.g., by retrieving the DEKs 140 from the persistent data store 114 and storing them temporarily (while the process of the KEK rotator 126 is running) in the tenant DEK cache 132. The tenant DEKs 140 are decrypted (by the KEK rotator 126) and cached in the cache 132 using the prior KEK (KEK 0, which is to be rotated out).

The KEK rotator 126 then uses the existing KEK (KEK 0) to encode the new KEK (KEK 1, to be rotated to) and store it in the persistent data store 114 as the new KEK 138. Note that caching or storage of the new KEK 138 (KEK 1) in the persistent data store 114 may occur before or after the storage of the DEKs, in the clear, in the secure tenant DEK cache 132.

The new KEK (KEK 1, to be rotated to) is retrieved (by the KEK rotator 126 via the controller 118) from the persistent data store 114 and used by the KEK rotator 126 and accompanying process to re-encode the tenant DEKs (maintained in the tenant DEK cache 132) in preparation for storage as the newly encrypted DEKs 140 in the persistent data store 114.

Note that the KEK rotator 126 implements the KEK rotation as a background process, i.e., independently of tenant request processing 120. After encryption of the tenant DEKs (e.g., as may be accessed by the KEK rotator 126 from the tenant DEK cache 132, via the controller 118) by the KEK rotator 126 (in communication with the KEK encrypter 124), the new KEK (KEK 1) is then registered as the newly loaded and used KEK 134 for future or subsequent tenant request processing 120 operations (which may include retrieving tenant DEKs responsive to tenant DEK requests).

After updating of the currently used KEK (KEK 0) to the new KEK 134, the new KEK (KEK 1) then acts as the prior KEK (KEK 0) for the next rotation operation, such that KEK 1 acts as KEK 0 for subsequent rotations to the next KEK (e.g., KEK 2).

Note that by maintaining the new KEK (KEK 1) in the persistent data store 114 (e.g., database), request-handling processes (e.g., implemented by the tenant request processing module 120) may readily serve requests from different tenants by using the registered KEK 134 that is accessible to the tenant request processing 120 via the persistent data store 114, as the stored KEK 138. Alternatively, the tenant request processing 120 uses the locally stored KEK 134 to decrypt DEKs, so as to service requests by tenants 112 for their DEKs.

Note that generally, tenants 112 may wish to access their data that has been encrypted using DEKs, which have been encrypted via the currently used (by the KEK rotation system 110) KEK. The present example embodiment eliminates the need for downtime of the tenant request processing 120 and/or downtime of the overall KEK rotation system 110. The KEK rotation system 110 is able to simply migrate to use of the new KEK (KEK 1), as discussed more fully below.

Seamless migration to use of the new KEK (KEK 1) is enabled, in part, by strategic use of the tenant DEK cache 132, which enables the tenant request processing module 120 to access DEKs in the tenant DEK cache 132 while the KEK rotation process implemented by the KEK rotator 126 runs as a background process.

The batch processing of tenant DEKs performed by the KEK rotator 126 includes processing predetermined sized batches (e.g., batches of 10) of DEKs during encoding of the DEKs (in the tenant DEK cache 132).

KEK rotation processing involves re-encryption of the DEKs in the secure tenant DEK cache 132 using the new KEK 1 138, so as to yield the newly encoded DEKs 140. The newly encoded DEKs 140 are maintained in the persistent data store 114 and usable by the tenant request processing module 120 to service requests for DEKs by the tenants 112.

Note that the exact batch size used by the KEK rotator 126 (when processing batches of DEKs) is implementation specific and may vary depending upon the needs of a given implementation, without departing from the scope of the present teachings. In general, the batch size is chosen in view of a tradeoff between computing resources that would be required to re-process DEKs in the event of a system outage and the computing resources that would be required to frequently update the persistent data store 114 with state information 142 indicating a state of operation (e.g., the state of encoding of existing tenant DEKs using the new KEK 138).

Note that the tenant request processing module 120 may access the DEKs 140 (in the persistent data store 114) via the controller 118 to service tenant requests for their DEKs during a given KEK rotation process. After a given KEK rotation process, when servicing such a request (e.g., a tenant request for their DEKs), the tenant request processing module 120 may reference the currently registered KEK 134 to decrypt the collection of one or more DEKs for a particular client.

Transition to using a newly registered KEK can be virtually instantaneous, as when the registered KEK 134 is replaced with the new KEK 1, the tenant request processing module 120 will then automatically start using the new KEK to facilitate servicing DEK requests from the tenants 112 (as the used KEK is the registered KEK 134). Accordingly, the KEK rotation system 110 eliminates the need for any downtime of the tenant request processing module 120, or any tenant cloud services of the tenants 112. The servicing of DEK requests proceeds without interruption.

Note that the methods and concepts used by the present example embodiment are not limited to use with multi-tenant computing environments, but are also usable with multi-instance environments and hybrid multi-tenant and multi-instance environments.

Furthermore, note that the present example embodiment eliminates any need to archive or maintain old KEKs, thereby enhancing overall system security and reducing computing resources needed to store and maintain old KEKs. Old KEKs are simply replaced by new KEKs. DEKs are then simply decrypted and/or re-encrypted using the new KEK.

In summary, when a KEK rotation request is received by the KEK rotation system 110, the KEK value (KEK 1) is accepted and saved in a persistent store 114 (as the KEK 1 138), after KEK 1 is encrypted using the older KEK 0. The controller 118 and/or KEK rotator 126 may assign a task identification (task ID) to the process being implemented by the KEK rotator 126. The task ID is usable by the administrator system 116 to query the KEK rotator 126 for the current state 142 of the rotation operation, the current state of which is maintained in the persistent data store 114 as the rotation operation state 142.

The administrator system 116 may then use the task ID (which may be issued to the administrator system 116 via the controller 118) to selectively query the KEK rotation system 110 and accompanying KEK rotator 126 and/or persistent data store 114 to check the status of the rotation operation. None of these operations pertaining to KEK updating or tenant request processing 120 require any service (and/or accompanying process) downtime. This is facilitated by the fact that the tenant DEKs are cached in local secure memory 132 and already decrypted using the older KEK 0; so tenant security data (DEKs and associated data encrypted thereby) can still be decrypted and processed (e.g., by the tenant request processing 120), irrespective of the state of the KEK rotation operation 142.

Note that even if a cloud VM or container hosting the KEK rotation system 110 goes offline (e.g., due to a power outage), the state of the key rotation operation 142 is still maintained in the persistent store 114. The persistent data store 114 and accompanying rotation operation state 142 include information about which tenant DEKs have been processed. Accordingly, when a KEK rotation operation resumes after an outage, previously processed DEKs (that are outside of the current batch of DEKs being processed) of previously processed batches do not require reprocessing.

The DEK decryption and re-encryption may be done in batches of 10 (or another batch size suitable for a given implementation), e.g., so that if the KEK rotation operation fails, the KEK rotator 126 (e.g., at the time of reboot) is either in a usable state or will be rolled back to a previous batch processing state that represents a usable state (i.e., usable by the KEK rotator 126 to resume re-encrypting DEKs using the new KEK 1).

Once processing is completed for all the tenants and their associated DEKs, the new KEK 1 138 from the persistent store 114 is loaded as the current KEK 134. All of the DEKs are encrypted in the store 140 with the new KEK 1. None of the DEKs in the local memory 132 may require changing, since they represent already decrypted and loaded DEKs.

Accordingly, the present example embodiment discloses a system and method enabling KEK rotation in a multi-tenant and/or multi-instance system, without requiring any downtime of services implemented by the system.

Figure 2:
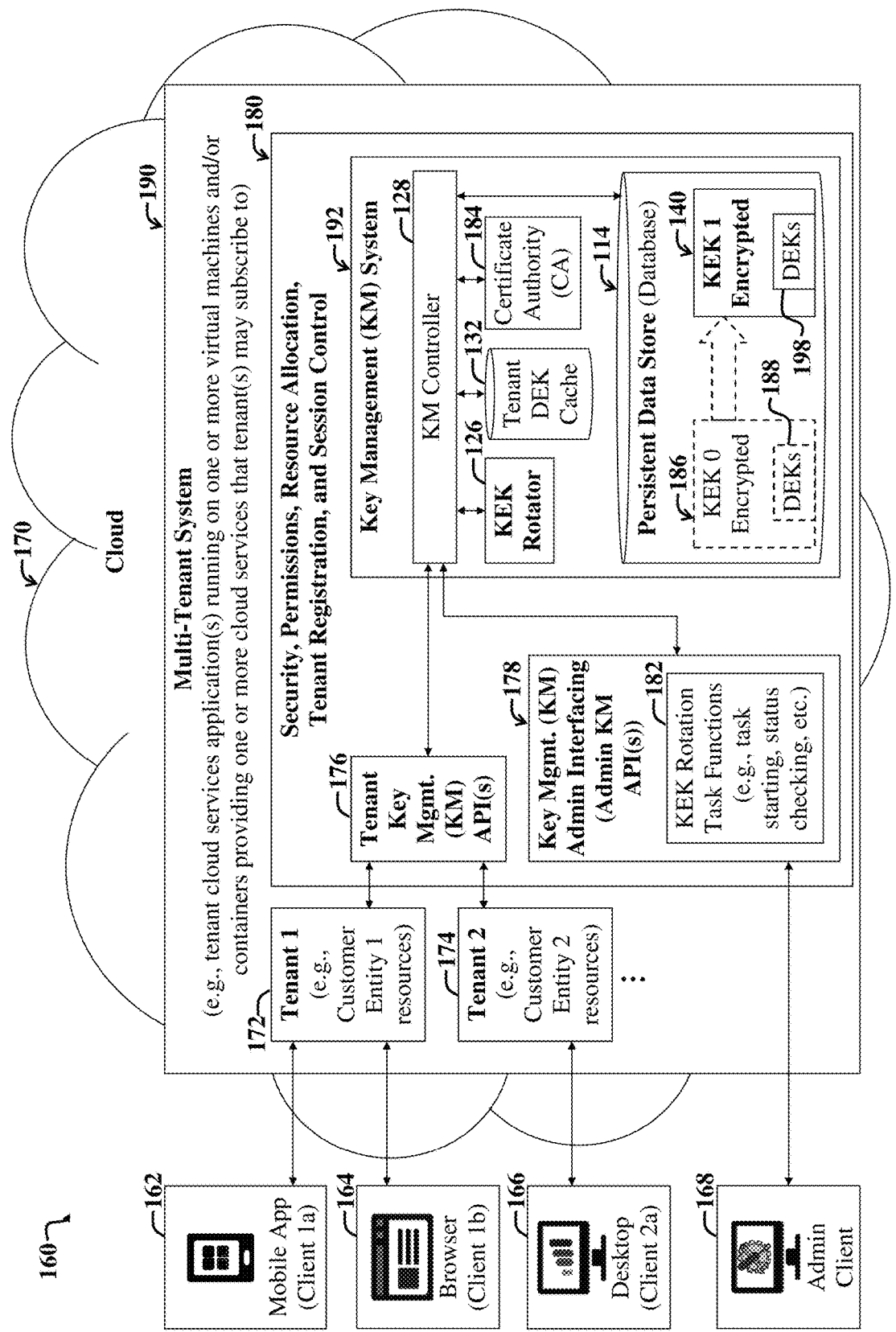
FIG. 2 is a second block diagram illustrating a second example system and accompanying multi-tenant computing environment employing an integration cloud, where tenants thereof communicate with a security and permissions module implementing the KEK rotation system.

FIG. 2 is a second block diagram illustrating a second example system 160 and accompanying multi-tenant computing environment employing an integration cloud 170, wherein tenants thereof communicate with a security and permissions module 180 implementing a KEK rotation system 192.

Note that the illustrated second example system 160 differs from the first example system 100 of FIG. 1 in various ways. For example, with reference to FIGS. 1 and 2, functionality provided by the KEK decrypter 122, KEK Encrypter 124, and KEK rotation scheduler 130 of FIG. 1 are incorporated into the Key Management (KM) controller 128 of FIG. 2. Furthermore, functionality of the tenant request processing module 120 of FIG. 1 may be incorporated into the tenant Key Management (KM) Application Programming Interface (API) 176 of FIG. 2. In addition, the KM administration interfacing APIs 178 shown in FIG. 2 may be implemented within the controller 118 of FIG. 1.

The second example system 160 includes various example tenant clients 162-168 in communication with server-side (e.g., cloud-based) tenant computing resources 172, 174. Note that while only two example tenants 172, 174 are shown in FIG. 2, that in practice, the multi-tenant system 190 may include an arbitrary number of tenants, e.g., many thousands of tenants.

The example tenant clients 162-168 include a first mobile application 162 of a first customer, and a browser client 164 of the first customer (e.g., a customer entity 1). The first customer has been allocated a first set of tenant resources 172. The first set of tenant resources 172 represent a share of resources of one or more instances of software running on or in association with the integration cloud 170, and which have been allocated to the first customer (corresponding to a first tenant). Recall that a tenant may be a group of one or more users sharing common access to one or more software instances and associated computing resources.

Another example desktop tenant client 166 is allocated a set of second tenant resources 174. The second desktop client 166 may be, for example, a software application running on a desktop computer and specifically configured to facilitate access to (and interaction with) functionality and associated resources provided via the second set of tenant resources 174.

An example administrator client 168 may be implemented as a program (e.g., a browser) running on an administrator computer. The administrator client 168 may be similar to the administrator system 116 of FIG. 1 in function and operation. The example administrator client 168 communicates with one or more server-side Key Management (KM) interfacing APIs (and/or web services) 178.

Note that, for the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server.

In the present example embodiment, the first set of tenant resources 172 (representing a first tenant, which is associated with a first customer) communicates with one or more tenant KM APIs (and/or web services) 176. Similarly, the second set of tenant resources 172 also communicates with the one or more tenant KM APIs 176 of the multi-tenant system 190.

Note that the multi-tenant system 190, which is implemented in the cloud 170, includes the tenant resources 172, 174 in communication with a security and permissions module 180. The security and permissions module 180 includes functionality for handling not just security for communications with the tenant resources 172, 174, but functionality for facilitating allocation of resources to the tenants 172, 174; authentication of clients 162-166 using the tenant resources 172, 174; tenant registration, session control, and so on. Those skilled in the art with access to the present teachings may readily develop and implement such functionality, without undue experimentation, so as to meet the needs of a given implementation.

The example security and permissions module 180 of the multi-tenant system 190 further includes the KM administrator interfacing API 178. Note that both the tenant KM API 176 and the KM administrator interfacing API 178 both communicate with a KM system 192 via a KM controller 128. The example KM system 192 includes the KM controller 128 in communication with the KEK rotator 126, a secure tenant DEK cache 132, a Certificate Authority (CA) 184, and the persistent data store 114.

In operation, various tenant clients 162-166 access tenant resources 172, 174, which may include, for example, dedicated shares of instances of software applications, e.g., database applications, file systems, data storage, and so on. The tenant resources 172, 174 include functionality for leveraging the tenant KM APIs 176 to obtain their DEKs needed to access data and functionality allocated to the tenant resources 172, 174. The tenant resources 172, 174 may first issue requests to the KM system 192 (via the tenant KM APIs 176) to obtain their associated DEKs; before accessing data and/or functionality associated with their respective tenant resources 172, 174.

The tenant KM APIs 176 may initially initiate a so-called handshake operation with the KM system 192, whereby the Certificate Authority (CA) 184 authenticates the requesting tenants 172, 174 using tenant-supplied certificates. Once authenticated, the tenants 172, 174 may gain access to their DEKs, which are then subsequently usable to access the data and functionality allocated thereto as part of the tenant resources 172, 174. Note that, for the purposes of the present discussion, a certificate authority may be any entity or mechanism for managing digital certificates, signatures, etc., e.g., by creating public and private key pairs; creating or issuing certificates; authenticating and/or verifying certificates, and so on.

The above-described process can be summarized as follows. An authorized user employs a tenant client, e.g., the mobile application 162, to request access to data that has been encrypted with an associated tenant DEK. The tenant resources (e.g., Tenant 1 resources 172), which may include a database application, file system, etc., then sends a DEK retrieval request to the tenant KM API 176. The tenant KM API 176 and the KM system 192 then verify each other's certificates.

Certificate verification may involve the tenant KM API 176 sending a certificate to the KM system 192 for verification. The KM system 192 may then authenticate the requesting client and associated tenant using the supplied certificate, with reference to corresponding data provided by the Certificate Authority (CA) 184. After the certificate supplied by the KM API 176 to the KM system 192 has been verified, the KM system 192 then sends its certificate to the KM API 176 for authentication and acceptance.

After the certificates of the tenant KM API 176 and KM system 192 have been mutually accepted, a secure Transport Layer Security (TLS) connection may be established between the KM API 176 and the KM system 192. This may involve use of a shared secret (corresponding to the retrieved DEK) usable for symmetric encryption of messages between the KM API 176, the KM system 192, and also for messages exchanged between the mobile applications 162-166 and their respective tenant resources 172, 174, so as to facilitate client access to data and functionality afforded to the clients via the tenant resources 172, 174.

After the KM APIs 176 and the KM system 192 have established a secure TLS connection, then the KM system 192 may then decrypt the requested DEK using the current KEK (KEK 0). The KM system 192 may then deliver the requested DEK to the KM API 176 via the secure TLS session. The KM API 176 may then send the DEK to the requesting resource of the tenant resources 172, 174, e.g., so as to facilitate client access to the associated tenant resources (which may include database functionality, file systems, data storage, etc.). The tenant resources 172, 174 may then send plain text data (e.g., as may be retrieved from data storage, etc.) to the clients 162-166, which may then be accessible to users of the clients 162-166.

In the present example embodiment, the currently used KEK (KEK 0) is to be rotated, i.e., changed, without compromising or interfering with the above-described process, whereby a tenant obtains a DEK for access to their tenant resources 172, 174. In an example scenario, the administrator client 168 issues a request to the KM system 192 (via the KM administrator interfacing API 178) to imitate KEK rotation.

Note that the KM administrator interfacing API 178 includes administrator functionality 182, which includes functionality for enabling the administrator client 168 to issue request messages (e.g., signals) to the KM system 192 to initiate KEK rotation. The administrator functionality 182 further includes KEK process status checking functionality, where by an authorized administrator employing the authorized administrator client 168 can check with the KM system 192 to determine the status of a given KEK rotation operation.

In the present example embodiment, when the KM system 192 receives a KEK rotation request message (e.g., signal) from the KM administrator interfacing API 178, the KM system 192 begins a process to implement KEK rotation. As set forth above, KEK rotation, as discussed herein, involves transitioning DEKs 188, which have been encoded with a preexisting KEK (KEK 0) 186, into DEKs 198, which are encoded with a new KEK 140 to be rotated to.

The KEK rotation process involves the KM controller 128 first decoding the DEKs 188 (maintained in the persistent data store 114) using the preexisting KEK (KEK 0); then caching the resulting decrypted (also called decoded herein) DEKs in the tenant DEK cache 132. While the DEKs are temporarily stored in the tenant DEK cache 132, the KM controller 128 can continue servicing tenant requests for their DEKs, e.g., via the tenant KM API 176. Note that the tenant KM API 176 and/or the KM controller 128 may include code for switching servicing of tenant DEK requests from the persistent data store 114 to the tenant DEK cache 132 during a particular KEK rotation operation.

The KM controller 128 communicates with the KEK rotator 126 to implement KEK rotation in batches. The KEK rotation involves re-encoding (i.e., re-encrypting) tenant DEKs in the tenant DEK cache 132 using the new KEK (KEK 1); then storing (in the persistent data store 114) the resulting encoded DEKs 198, which have been encoded via the new KEK 140. Note that, as discussed with reference to FIG. 1, the new KEK (KEK 1) may be temporarily stored in the persistent data store 114 after encryption of the new KEK (KEK 1) via the prior KEK (KEK 0), during the KEK rotation process.

After all batches of DEKs from the tenant DEK cache 132 have been encoded using the new KEK (KEK 1) and stored in the persistent data store 114 as KEK 1 encrypted DEKs 140, then the KEK rotation process completes. The tenant DEK cache 132 may then be flushed, and subsequent tenant requests for their DEKs may be serviced from the persistent data store 114.

Figure 3:
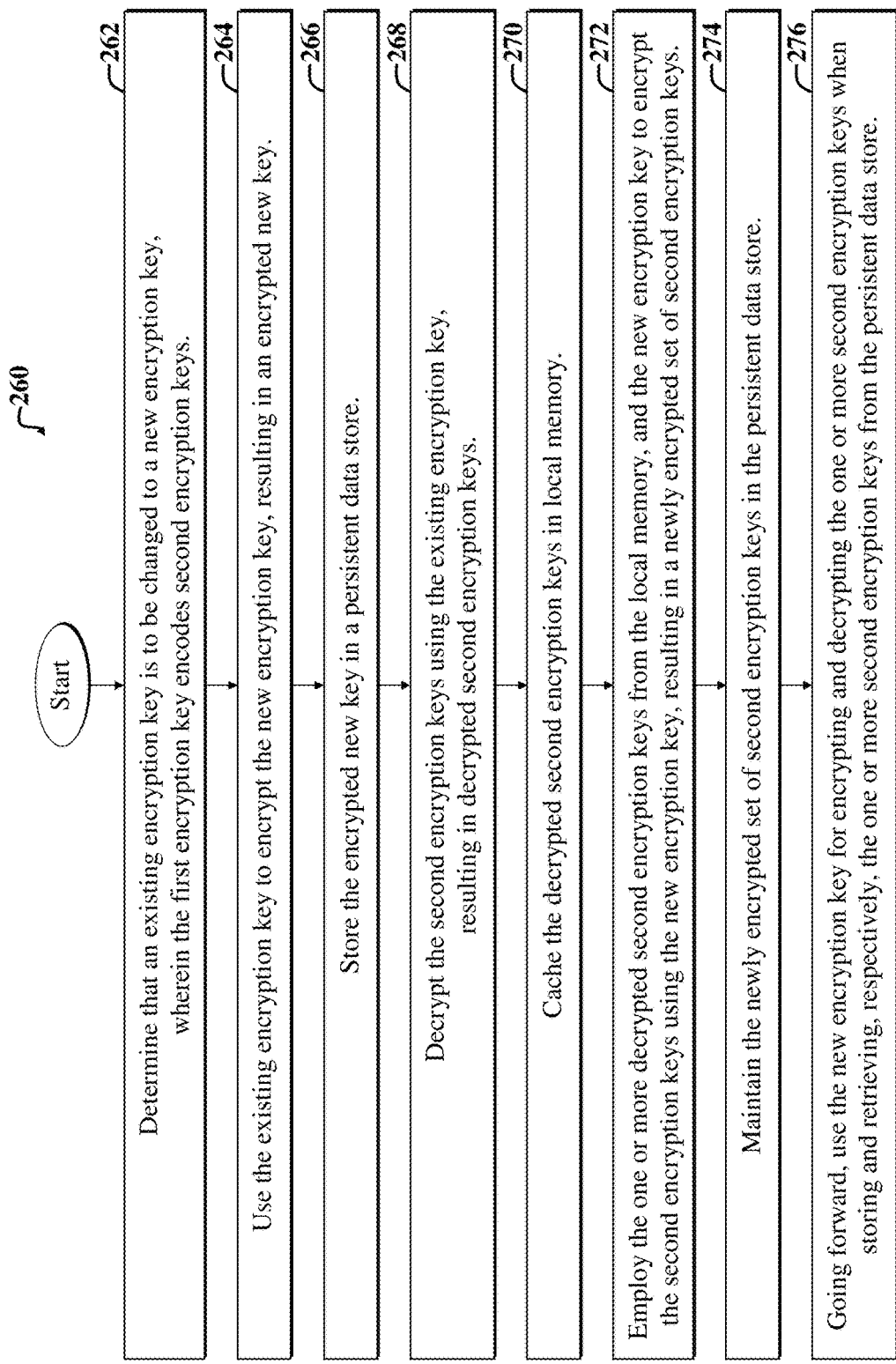
FIG. 3 is a first flow diagram of a first example method implementable via the embodiment of FIGS. 1-2.

FIG. 3 is a flow diagram of an example method 260 implementable via the example system 100 of FIGS. 1-2. The example method 260 facilitates changing an encryption key (e.g., a KEK) in a multi-tenant and/or multi-instance computing environment. The encryption key is used to encrypt one or more tenant encryption keys (called DEKs or TEKs herein) used by one or more tenants of the multi-tenant computing environment.

The example method 260 includes a first step 262, which involves determining that an existing encryption key (e.g., KEK 0) is to be changed to a new encryption key (e.g., KEK 1), wherein the first encryption key encodes one or more second encryption keys (e.g., DEKs).

A second step 264 includes using the existing encryption key (KEK 0) to encrypt the new encryption key, resulting in an encrypted new key (e.g., encrypted KEK 1).

A third step 266 includes storing the encrypted new key in a persistent data store. Note that in the example system 100 of FIG. 1, the encrypted new key (KEK 1) is stored in the persistent data store 114 as the new KEK 138.

A fourth step 268 includes decrypting the one or more second encryption keys (e.g., DEKs) using the existing encryption key, resulting in one or more decrypted second encryption keys.

A fifth step 270 includes caching the one or more decrypted second encryption keys in local memory. Note that in the example system 100 of FIG. 1, the decrypted second encryption keys are maintained in the clear in the tenant DEK cache 132. The tenant DEK cache 132 is called a secure local memory, as access to the cache is limited to, or otherwise governed by, the KEK rotation system 110 and accompanying processes 120, 126.

A sixth step 272 includes employing the one or more decrypted second encryption keys (DEKs) from the local memory (e.g., the tenant DEK cache 132 of FIG. 1), in combination with the new encryption key (KEK 1) from the persistent data store (e.g., the data store 114 of FIG. 1), to encrypt the one or more second encryption keys (DEKs) using the new encryption key (KEK 1), resulting in a newly encrypted set of one or more second encryption keys (e.g., the DEKS 140 of FIG. 1).

A seventh step 274 includes maintaining the newly encrypted set of one or more second encryption keys in the persistent data store.

An eighth step 276 includes subsequently using the new encryption key (KEK 1), which has now been rotated to (e.g., and maintained as the newly registered KEK 134 of FIG. 1), for encrypting and decrypting (e.g., by the tenant request processing module 120 of FIG. 1) the one or more second encryption keys (DEKs) when storing and retrieving, respectively, the one or more second encryption keys (DEKs) from the persistent data store (e.g., when retrieving the DEKs 140 of the persistent data store 114 of FIG. 1).

Note that first example method 260 may be modified, without departing from the scope of the present teachings. For example, steps may be interchanged, omitted, new steps may be added, and/or additional details may be added to each step of the method 260.

For example, the first example method may further specify that the first step 262 further includes receiving a request from one or more administrator systems to rotate the first encryption key.

The first encryption key may be specified as a KEK, and the one or more second encryption keys may be specified as one or more DEKs. The example method 260 may further specify that the one or more DEKs are usable to encrypt data associated with one or more respective tenants of a multi-tenant computing environment, wherein the one or more respective tenants include customers of a cloud service.

The example method 260 may further specify that the one or more respective tenants further include computing resources of the cloud service (e.g., resources included in association with the tenants 112 of FIG. 1) that are allocated to different tenants of the one or more respective tenants. The data associated with one or more respective tenants may include one or more tenant credentials, tokens, and/or other data, used by one or more computing resources allocated for use by the one or more respective tenants. The allocated one or more computing resources may include resources of a multi-tenant software application that are allocated to and/or otherwise usable by a subscribing tenant, thereby enabling access to data and functionality that the tenant has subscribed to.

The example method 260 may further include a step that specifies repeating the steps of the first example method 260 when the new encryption key (KEK 1) is to be rotated to another newer encryption key, as indicated by a request message received by a process used to implement the steps 262-276 of the first example method 260.

Decryption of the one or more second encryption keys (e.g., as performed in the fourth step 268) may further include retrieving the existing encryption keys (DEKs) from the persistent data store; and then using the retrieved existing encryption key (KEK 0) to decode tenant data using the one or more second encryption keys (DEKs), thereby resulting in the one or more decrypted second encryption keys (DEKs).

The fifth step 270 involving caching of the second encryption keys (DEKs) may further include maintaining the one or more decrypted second encryption keys (DEKs) in local memory (e.g., Random Access Memory (RAM) represented by the secure local memory 132 of FIG. 1) in the clear, such that the one or more decrypted second encryption keys (DEKs) are accessible to a process (e.g., a process implemented by the tenant request processing module 120 and accompanying KEK rotation system 110 of FIG. 1) used to implement the first example method 260.

Note that accessibility to the local memory 132 of FIG. 1 is substantially limited to the computing system 110 and accompanying process (e.g., process implemented by the tenant request processing module 120 and the process implemented by the KEK rotator 126) used to implement the first example method 260.

The sixth step 272 may further include performing batch processing of the one or more decrypted second encryption keys (DEKs), whereby batches of decrypted second encryption keys (DEKs) are encrypted using the new encryption key before storage as the encrypted DEKs 140 of FIG. 1. The batches may include a predetermined number of second encryption keys to be encrypted using the new encryption key.

Hence, the first example method 260 may further specify that a set of one or more DEKs are encrypted using a preexisting KEK (e.g., KEK 0). A new KEK (KEK 1), to which the existing KEK 0 is to be rotated, is used to re-encrypt the DEKs maintained in the tenant DEK cache 132 of FIG. 1. Simultaneously, service requests from tenants requesting their DEKs can be handled without interruption, e.g., by selectively accessing the DEKs in the cache 132. Note that in the example embodiment of FIG. 1, all tenant DEKs are cached in memory 132, and already decrypted using the older KEK (KEK 0). Hence tenant security data encoded using DEKs can continue to be decrypted and processed by the tenant request processing module 120 of FIG. 1, irrespective of the state of the KEK rotation operation performed by the KEK rotator 126 of FIG. 1. Note that KEK decryption and re-encryption may be performed as part of a database transaction with the persistent data store 114.

In certain embodiments, addition of additional tenants to the tenants 112 of FIG. 1 is paused while the KEK rotation process is performed by the KEK rotator 126 of FIG. 1. By maintaining DEKs in the local memory (e.g., tenant DEK cache 132 of FIG. 1) during implementation of a KEK rotation operation as a background process, service interruption or downtime, due to implementation of a KEK rotation operation, is prevented or obviated.

Figure 4:
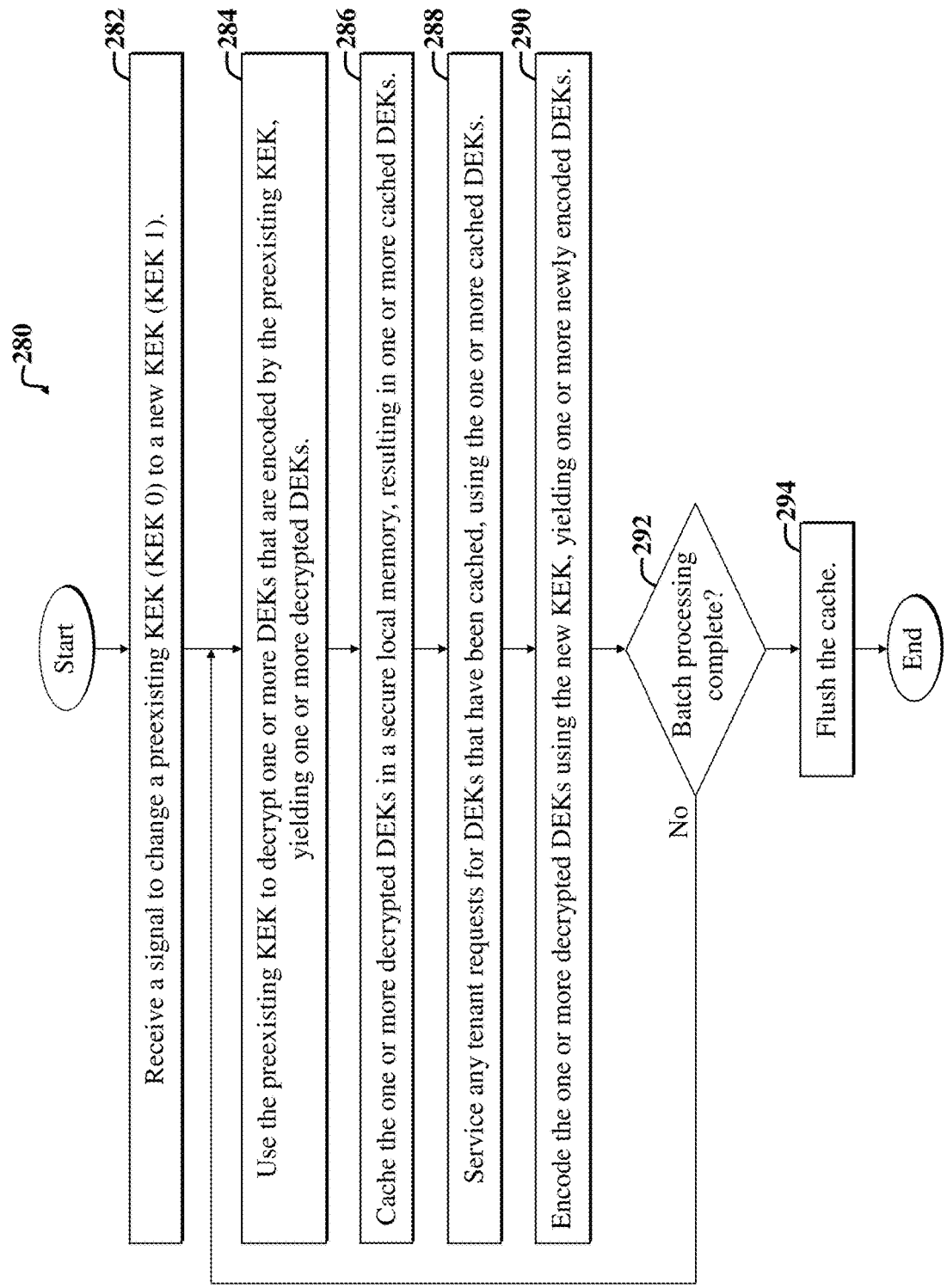
FIG. 4 is a second flow diagram of a second example method implementable via the embodiments of FIGS. 1-2.

FIG. 4 is a second flow diagram of a second example method 280 implementable via the embodiments of FIGS. 1-2. The second example method 280 facilitates changing, i.e., rotating a KEK in a networked computing environment, such as a cloud-based multi-tenant and/or multi-instance computing environment, where multiple tenants may access their DEKs (that are encrypted with a KEK) during KEK rotation process.

An initial signal-receiving step 282 includes receiving a signal to initiate KEK rotation, i.e., the changing of a preexisting KEK (KEK 0) to a new KEK (KEK 1). With reference to FIG. 2, this signal may originate from the administrator client 168 and be routed through the administrator Key Management (KM) API 178 to the KM system 192, which receives the signal to begin KEK rotation. Similarly, in FIG. 1, this signal may originate from the administrator system 116 and/or the KEK rotation scheduler 130, where it is then received by the controller 118 of the KEK rotation system 110.

Next, a DEK-decrypting step 284 includes using the preexisting KEK (KEK 0) to decrypt one or more DEKs that have been encoded by the preexisting KEK, thereby yielding one or more decrypted DEKs. With reference to FIG. 2, this decryption may be performed in the KM controller 128. In FIG. 1, this decryption may be performed by the KEK decrypter 112, which can use a KEK to decrypt a DEK. Also note that the KEK decrypter 112 may also decrypt a KEK that has been encoded with another KEK, provided that the KEK decrypter 122 has access to the other KEK (used for encoding) and the data to be decrypted.

Next, with reference to FIG. 4, a DEK-caching step 286 includes temporarily (i.e., until no longer needed, e.g., upon completion of KEK rotation) caching the one or more decrypted DEKs (that were decrypted in the DEK-decrypting step 284) in a secure local memory, resulting in one or more cached DEKs. With reference to FIG. 2, the tenant DEK cache 132 acts as the secure local memory. The tenant DEK cache 132 can be implemented via Random Access Memory (RAM) or other memory that is dedicated for use by the KM controller 128 of FIG. 2 and associated KEK rotation process and tenant DEK request handling during KEK rotation.

Subsequently, with reference to FIG. 4, a DEK-request servicing step 288 includes using the one or more cached DEKs to selectively service any tenant requests for DEKs that have been cached. With reference to FIG. 2, the servicing may be handled, in part, via the tenant KM API 176 and the KM controller 128, where the KM controller 128 also communicates with the tenant DEK cache 132 and the Certificate Authority (CA) 184.

Next, with reference to FIG. 4, a KEK-rotating step 290 includes encrypting the one or more decrypted DEKs (which have been cached in local memory) using the new KEK (KEK 1), thereby yielding one or more newly encoded DEKs. With reference to FIG. 2, the encrypting of the DEKs may be implemented via the KM controller 128 and/or functionality (e.g., database management system) of the persistent data store 114, where the encrypted DEKs 140, 198 are stored. Note that in FIG. 1, the encrypting may be implemented via the KEK encrypter 124 and stored as the newly encoded DEKs 140.

Note that in the present example embodiment, the decrypting of DEKs in step 284; the caching of the decrypted DEKs in step 286; the servicing of tenant DEK requests in step 288, and the encrypting of the DEKs using the new encryption key (KEK 1), are performed in batches, e.g., batches of ten DEKs. Accordingly, steps 284-290 implement so-called batch processing.

Subsequently, a completion-checking step 292 determines if batch processing (which includes encrypting decrypted DEKs using the new KEK (KEK 1) in batches of a predetermined size) has completed, i.e., if all DEKs to be encrypted using KEK 1 have been successfully encrypted and stored, e.g., in the persistent data store 114 of FIGS. 1-2.

If the batch processing has completed, then the tenant DEK cache (e.g., the cache 132 of FIGS. 1-2) may be flushed, e.g., in a cache-flushing step 294.

If not all batches of DEKs have been processed, i.e., encrypted using KEK 1, then the example method 280 returns to the DEK-decrypting step 284, and the cycle continues until batch processing is complete. Accordingly, steps 284-292 of the second example method 280 are repeated until all DEKs previously encoded with the preexisting KEK (KEK 0) are now encoded using the new KEK (KEK 1).

Note that the method 280 may be modified, e.g., steps may be altered; new steps may be added; certain steps may be omitted, etc., without departing from the scope of the present teachings. For example, the cache-flushing step 294 may also be implemented in batches, whereby the cached DEKs of a given batch are flushed from cache once they have been encrypted using the new KEK (KEK 1) and stored in the persistent data store 114.

As another example, the method 280 may further specify using the one or more newly encrypted DEKs to service subsequent (e.g., subsequent to flushing the cache in step 294) tenant requests for one or more DEKs that are included among the one or more newly encrypted DEKs (i.e., newly encrypted at step 290), thereby transitioning the new KEK (KEK 1) to a preexisting KEK (KEK 0) for the purposes of a subsequent KEK rotation.

The second example method 280 may further specify that the preexisting KEK (KEK 0) is used to decrypt the one or more DEKs in one or more batches of a predetermined size, e.g., between approximately five and twenty DEKs; and to encrypt the one or more decrypted DEKs in one or more batches of DEKs of the same predetermined size as to decrypt the one or more DEKs.

The second example method 280 may further specify maintaining a queryable state of batch processing of the one or more DEKs, wherein the batch processing includes: employing the preexisting KEK to decrypt one or more DEKs in one or more batches of the predetermined size; and encoding the one or more decrypted DEKs in one or more batches of DEKs of the predetermined size.

The second example method 280 may further specify using the preexisting KEK (KEK 0) to encode the new KEK (KEK 1), resulting in an encrypted new KEK 1; and then storing the newly encrypted KEK 1 in a persistent data store (e.g., the data store 114 of FIGS. 1-2) prior to performing the KEK-rotating step 290. Furthermore, during the KEK-rotating step, the newly encrypted KEK 1 may be decrypted using the preexisting, i.e., prior KEK 0. After successful completion of the method 280, the prior KEK 0 may be discarded, i.e., it need not be archived.

Hence, embodiments are facilitated, in part, via use of a secure caching mechanism (e.g., including the tenant DEK cache 132 of FIGS. 1-2), and once KEK rotation has completed, the DEK cache may be flushed, and the prior KEK 0 may be discarded. Note that the batch-processing status may be tracked and queried.

For example, the second example method 280 may further specify issuing a task identification number (task ID) to the issuer of the received signal in the signal-receiving step 282, and subsequently tracking the status of the batch processing of steps 284-292. The status of the batch processing may be queried by the issuer of the signal, e.g., an administrator initiating the KEK rotation process of the second example method 280. The querying operation may be implemented, in part, via the administrator KM API 178 in communication with the KM controller 128 of FIG. 2.

Another more generalized method includes: decrypting and caching tenant DEKs using KEK 0; using the new KEK 1 from persistent data store to re-encrypt the DEKs; and storing newly encoded DEKs in the persistent data store (or other suitable memory), such that they selectively replace previously stored and encrypted DEKs (e.g., the DEKs 186, 188 of FIG. 2) with new values (e.g., values corresponding to the DEKs 198, 140, which have been encrypted using KEK 1), whereby KEK 1 then acts as KEK 0 for subsequent rotation to KEK 2.

Another alternative generalized method includes: decrypting a set of one or more DEKs using a preexisting KEK (KEK 0); using a new or different KEK (KEK 1) to re-encrypt the DEKs while simultaneously servicing any tenant DEK requests using the decrypted DEKs on an as needed basis, whereby the decrypted DEKs are cached in local memory, such that DEK-related tenant security data can still be readily decrypted (using the tenant DEKs) and processed, irrespective of the KEK rotation operation.

Note that DEK decryption and re-encryption may be performed as one or more database transactions, e.g., which may be implemented in batches of database transactions, which may be implemented, in part, by a database management application interacting with the persistent data store 114 of FIGS. 1-2.

Figure 5:
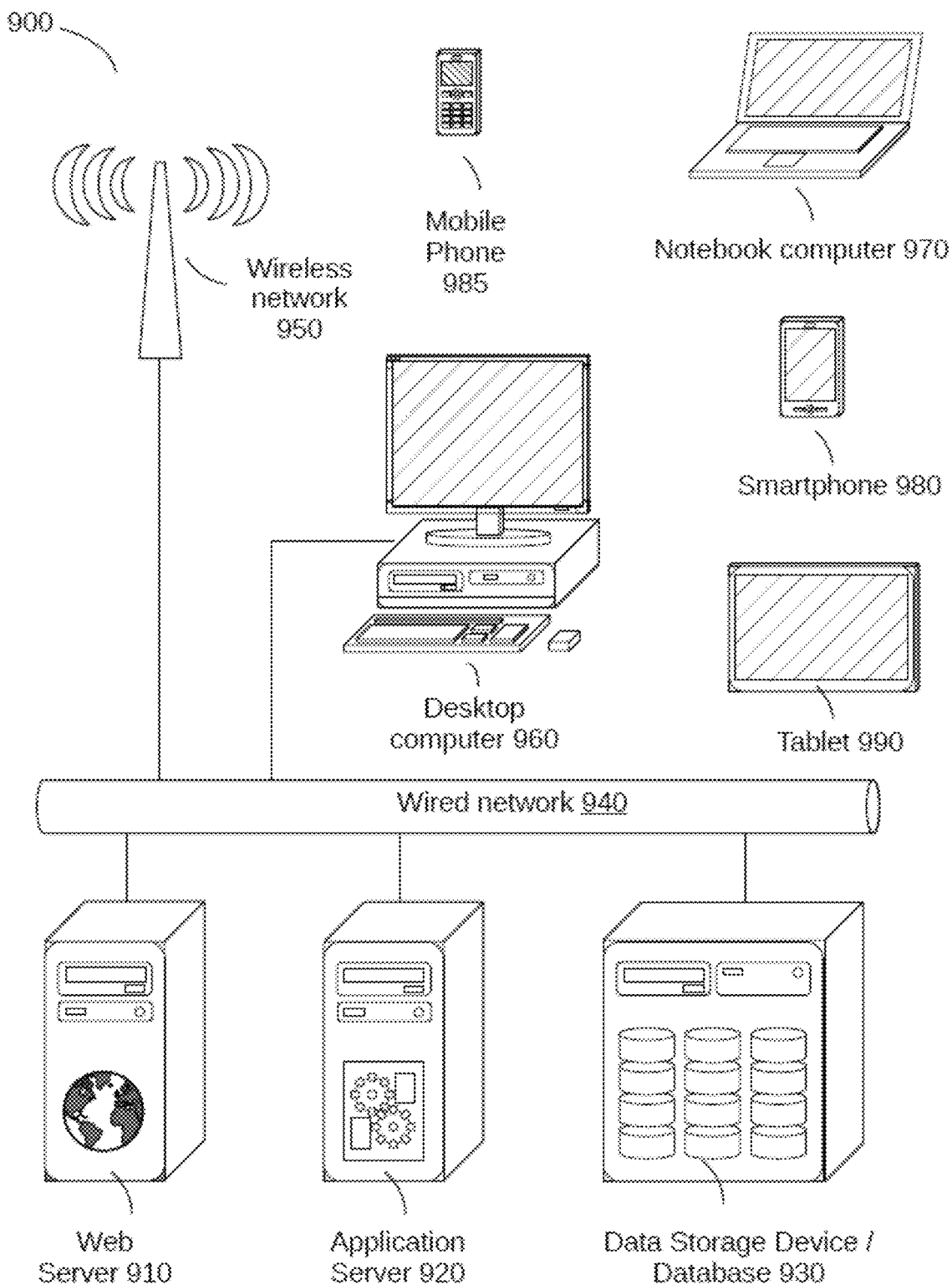
FIG. 5 is a general block diagram of a system and accompanying computing environment usable to implement the embodiments of FIGS. 1-2.

FIG. 5 is a general block diagram of a system and accompanying computing environment usable to implement the embodiments of FIGS. 1-2.

FIG. 5 is a general block diagram of a system 900 and accompanying computing environment usable to implement the embodiments of FIGS. 1-2. The example system 900 is capable of implementing the example computing environment 100 of FIG. 1 and accompanying method 260 of FIG. 3. Embodiments may be implemented using standalone applications (for example, residing in a user device) and/or using web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 2 and 5, the clients 162-168 of FIG. 2 may be implemented via one or more of the user computers 960-990 of FIG. 5. The cloud 170 of FIG. 2 may be implemented via the wired network 940 and one or more of the accompanying web server(s) 910 and application server(s) 920 of FIG. 5. The persistent data store 114 of FIG. 2 may be implemented via one or more of the data storage devices 930 of FIG. 5.

Note that in certain implementations, the one or more clients 162-168 of FIG. 2 may selectively access (in accordance with the their permissions) the tenant resources 172, 174 by first browsing to a website that provides one or more web pages with UI controls to access the tenant resources 172, 174. Such a web site may be hosted on the web server 910 of FIG. 5, which may communicate with the application server 920 to implement software actions in accordance with user interaction with the web page and accompanying UI controls.

The security ant permissions module 180 of FIG. 2 may include components running on the web server, the application server 920, and the data storage device 930 of FIG. 5. For example, the KM APIs 176, 178 of FIG. 2 may run on one or more of the application servers 920 and may be accessible to service calls from web page code hosted on the one or more web servers 910. The KM APIs 176, 178 of FIG. 2 may act as an interface between web page code running on the web servers 910 and functionality provided by the KM system 192 of FIG. 2, which may run on the one or more application servers 920.

Figure 6:
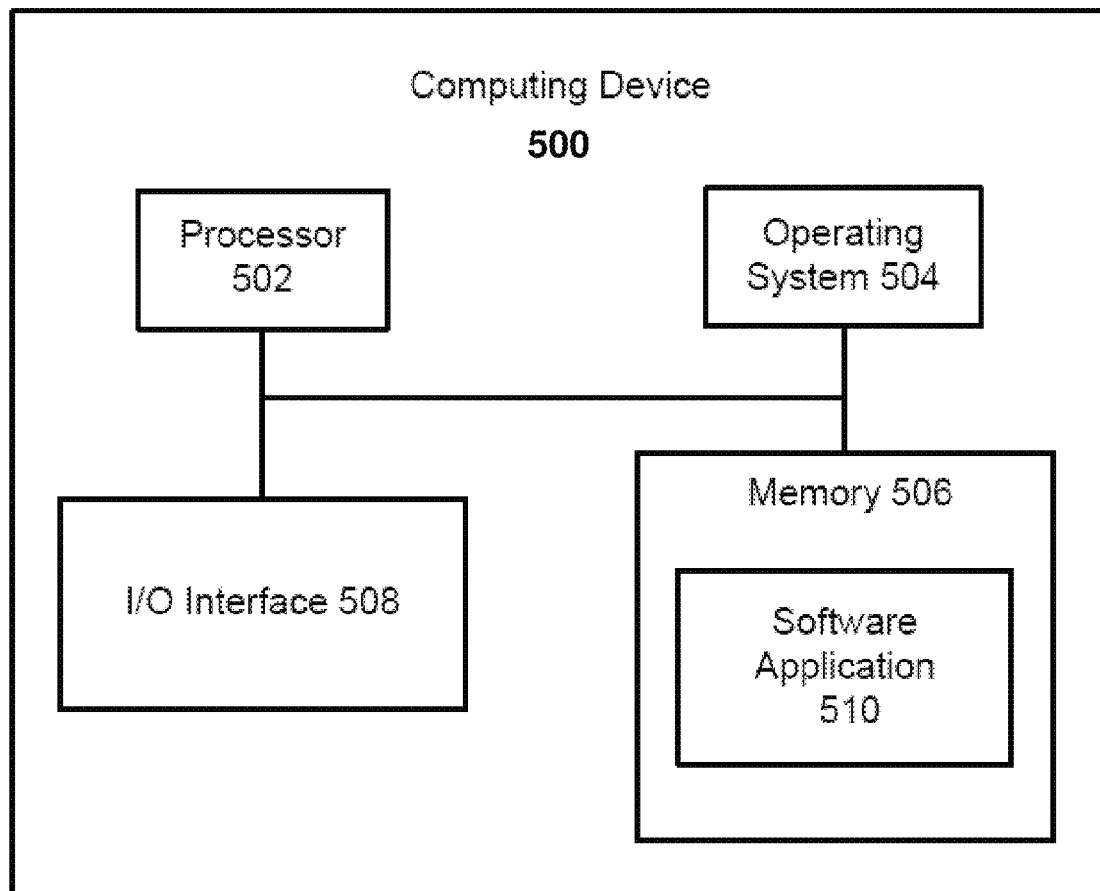
FIG. 6 is a general block diagram of a computing device usable to implement the embodiments of FIGS. 1-3.

FIG. 6 is a general block diagram of a computing device usable to implement the embodiments of FIGS. 1-3. While system 500 of FIG. 6 is described as facilitating performing the steps as described in certain implementations herein, any suitable component or combination of components of system 500 or any suitable processor or processors associated with system 500 may be used for performing the steps described.

FIG. 6 illustrates a block diagram of an example computing system 500, which may be used for implementations described herein. For example, computing system 500 may be used to implement server devices 910, 920 of FIG. 5 as well as to perform the method implementations described herein, e.g., to run the clients 162-168 of FIG. 2, wherein, for example, the software application 510 of FIG. 6 represents a browser, mobile application, or desktop client application tailored to facilitate interaction and communication with the multi-tenant system 190 of FIG. 2.

In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 6 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while certain embodiments are discussed herein with respect to performing a KEK rotation for a multi-tenant enterprise computing environment, embodiments are not limited thereto. Embodiments discussed herein may be readily adaptable to implement rotation of other types of cryptographical keys in various types of computing environments, without departing from the scope of the present teachings.

Although "caching" may be described in particular embodiments herein as including a specialized or dedicated system of hardware, software, or a combination of both; in other embodiments caching can be achieved by using general components such as local memory, RAM, magnetic drives, etc. The term "local memory" can refer to any storage that is geographically more proximate to a processor. This can be, for example, RAM or other storage in the same computer system as the processor, coupled directly to the processor or to the processor's computer system, on a local network with the processor, etc. as opposed to more remotely located storage or processing resources such as may be coupled over a wide-area network, the Internet, cloud resources, etc.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible and non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory processor-readable storage device including logic for execution by one or more processors and when executed operable for facilitating changing a first encryption key in a multi-tenant computing environment, by performing acts comprising:
    decrypting one or more second encryption keys using the first encryption key, wherein the first encryption key encodes the one or more second encryption keys, resulting in one or more decrypted second encryption keys;
    storing the one or more decrypted second encryption keys in local memory;
    determining that the first encryption key is to be changed to a new encryption key;
    using the first encryption key to encrypt the new encryption key, resulting in an new first encrypted key;
    storing the new first encrypted key in a persistent data store;
    encrypting the one or more decrypted second encryption keys from the local memory, in combination with the new first encryption key from a persistent data store, resulting in a newly encrypted set of one or more second encryption keys;
    maintaining the newly encrypted set of one or more second encryption keys in the persistent data store; and
    using a newly rotated first encryption key for encrypting and decrypting the newly encrypted set of one or more second encryption keys when storing and retrieving, respectively, the newly encrypted set of one or more second encryption keys from the persistent data store.

2. The non-transitory processor-readable storage device of claim 1, wherein determining further includes:
    receiving a request from one or more administrator systems to rotate the first encryption key.

3. The non-transitory processor-readable storage device of claim 2, wherein the first encryption key represents a Key Encryption Key (KEK).

4. The non-transitory processor-readable storage device of claim 3, wherein the one or more second encryption keys include one or more Data Encryption Keys (DEKs).

5. The non-transitory processor-readable storage device of claim 4, wherein the one or more DEKs are usable to encrypt data associated with one or more respective tenants.

6. The non-transitory processor-readable storage device of claim 5, wherein the one or more respective tenants include customers of a cloud service.

7. The non-transitory processor-readable storage device of claim 6, wherein the one or more respective tenants further include computing resources of the cloud service that are allocated to different tenants of the one or more respective tenants.

8. The non-transitory processor-readable storage device of claim 6, wherein the data associated with one or more respective tenants includes one or more tokens used by one or more computing resources allocated for use by the one or more respective tenants.

9. A method for facilitating changing an encryption key (Key Encryption Key) in a multi-tenant computing environment, wherein the encryption key is used to encrypt one or more tenant encryption keys used by one or more tenants of the multi-tenant computing environment, the method comprising:

decrypting one or more second encryption keys using the first encryption key, wherein the first encryption key encodes the one or more second encryption keys, resulting in one or more decrypted second encryption keys;

storing the one or more decrypted second encryption keys in local memory;

determining that the first encryption key is to be changed to a new encryption key;

using the first encryption key to encrypt the new encryption key, resulting in an new first encrypted key;

storing the new first encrypted key in a persistent data store;

encrypting the one or more decrypted second encryption keys from the local memory, in combination with the new first encryption key from a persistent data store, resulting in a newly encrypted set of one or more second encryption keys;

maintaining the newly encrypted set of one or more second encryption keys in the persistent data store; and using a newly rotated first encryption key for encrypting and decrypting the newly encrypted set of one or more second encryption keys when storing and retrieving, respectively, the newly encrypted set of one or more second encryption keys from the persistent data store.

10. The method of claim 9, wherein determining further includes:

receiving a request from one or more administrator systems to rotate the first encryption key.

11. The method of claim 10, wherein the first encryption key represents a Key Encryption Key (KEK).

12. The method of claim 11, wherein the one or more second encryption keys include one or more Data Encryption Keys (DEKs).

13. The method of claim 12, wherein the one or more DEKs are usable to encrypt data associated with one or more respective tenants.

14. The method of claim 13, wherein the one or more respective tenants include customers of a cloud service.

15. The method of claim 14, wherein the one or more respective tenants further include computing resources of the cloud service that are allocated to different tenants of the one or more respective tenants.

16. An apparatus comprising:

one or more hardware processors;

logic encoded in one or more non-transitory media for execution by the one or more hardware processors and when executed operable for:

determining that an existing encryption key is to be changed to a new encryption key, wherein the existing encryption key represents a first encryption key, and wherein the first encryption key encodes one or more second encryption keys;

using the existing encryption key to encrypt the new encryption key, resulting in an encrypted new key;

storing the encrypted new key in a persistent data store;

decrypting the one or more second encryption keys using the existing encryption key, resulting in one or more decrypted second encryption keys;

storing the one or more decrypted second encryption keys in local memory;

employing the one or more decrypted second encryption keys from the local memory, in combination with the new encryption key from the persistent data store, to encrypt the one or more second encryption keys using the new encryption key, resulting in a newly encrypted set of one or more second encryption keys;

maintaining the newly encrypted set of one or more second encryption keys in the persistent data store; and subsequently using the new encryption key for encrypting and decrypting the one or more second encryption keys when storing and retrieving, respectively, the one or more second encryption keys from the persistent data store.

17. The apparatus of claim 16, receiving a request from one or more administrator systems to rotate the first encryption key.

18. The apparatus of claim 16, wherein the first encryption key represents a Key Encryption Key (KEK).

19. The apparatus of claim 16, wherein the one or more second encryption keys include one or more Data Encryption Keys (DEKs) and the one or more DEKs are usable to encrypt data associated with one or more respective tenants.

20. The apparatus of claim 19, wherein the one or more respective tenants further include computing resources of a cloud service that are allocated to different tenants of the one or more respective tenants.

* * * * *